United States Patent
Brammer et al.

[11] Patent Number: 5,440,933
[45] Date of Patent: Aug. 15, 1995

[54] PRESSURE SLEEVE

[75] Inventors: Hartmut Brammer, Vaihingen; Romuald Fries, Weissach; Karl Dums, Renningen; Holger Krebs, Schwieberdingen, all of Germany

[73] Assignee: Robert Bosch GmbH, Stuttgart, Germany

[21] Appl. No.: 221,062

[22] Filed: Mar. 30, 1994

[30] Foreign Application Priority Data

Apr. 10, 1993 [DE] Germany .......... 43 11 920.4
Feb. 5, 1994 [DE] Germany .......... 44 03 660.4

[51] Int. Cl.⁶ .............................. G01L 19/00
[52] U.S. Cl. ............................ 73/756; 73/702
[58] Field of Search .......... 73/115, 756, 753, 702, 73/661

[56] References Cited

U.S. PATENT DOCUMENTS 4,559,821 12/1985 Engeler et al. .......... 73/756
4,906,031 3/1990 Vyse .
5,212,989 5/1993 Kodama et al. .......... 73/756

FOREIGN PATENT DOCUMENTS 2742058 3/1979 Germany .
8312524 9/1983 Germany .
8416116 5/1984 Germany .
8436486 7/1987 Germany .
3840703 6/1989 Germany .
4024339 2/1991 Germany .
0084538 4/1986 Japan .......... 73/115

Primary Examiner—Richard E. Chilcot, Jr.
Assistant Examiner—Max H. Noori
Attorney, Agent, or Firm—Michael J. Striker

[57] ABSTRACT

In a pressure sleeve in particular a vibration pickup, an abutment surface is formed as a circumferential ring at a location radially spaced from a central point. Therefore, the pressure sleeve can be fully pressed against the structure to be monitored by a mounting screw. Therefore a sensor provided with the pressure sleeve can approximately linearly extending and disturbance measuring signals.

7 Claims, 2 Drawing Sheets

PRESSURE SLEEVE

BACKGROUND OF THE INVENTION present invention relates to a pressure sleeve.

More particularly, it relates to a pressure sleeve with a vibration pickup, which has a supporting surface for mounting on a structural element, in particular an internal combustion engine, by amounting member extending through an opening of the pressure sleeve.

Pressure sleeves of the above mentioned general type are known in the art. Such pressure sleeves are used for knock sensors which are described for example in the U.S. Pat. No. 4,906,031 and the German patent document DE-OS 40 24 339. The pressure sleeve has a flat and plane supporting surface which is placed on a structural element for determination of vibrations of the structural elements. Due to the shape and working deficiency of the abutment surface, disturbing resonance can occur which can cause faulty measurements and disturbances in the connected circuit.

The German document DE-Gbm 83 12 524.8 discloses the holding device for oriented mounting of a measuring means. This mounting has a conical foot forming a circular elastic sealing lip. The sealing lips have different inclination angles, so that independently from the inclination on the mounting point, the measuring means arranged in the holding device is horizontally oriented. In this holding device the elastic and therefore easily deformable sealing lips provide a horizontal construction, for each purpose the angle of inclination must be relatively great. A plane placement of the measuring unit on the mounting place is not intended.

Further, the German document DE-Gbm 84 36 486.6 discloses a knock sensor which on the outer circumferential edge of the abutment surface is provided with a small region at a distance from the abutment surface. This outer edge is however used for performing the injection molding process. The pressure sleeve itself abuts approximately its whole surface against the mounting part, so that again disturbing resonance can occur.

SUMMARY OF THE INVENTION

Accordingly, it is an object of the present invention to provide a pressure sleeve which avoids the disadvantages of the prior art.

In keeping with these objects and with others which will become apparent hereinafter, one feature of the present invention resides, briefly stated, in a pressure sleeve in which at least one circumferentially raised portion is formed on the abutment surface of the pressure sleeve at a distance radially from its central point so that an angle of between 0.5° and 1.5° is formed between the opening for the mounting member and the inner circumference of the raised portion.

When the pressure sleeve is designed in accordance with the present invention, the mechanical coupling of the pressure sleeve and thereby of the sensor on the structural element to be monitored is improved. Disturbing tilting movements of the pressure sleeve and thereby of the sensor due to shape inaccuracies of the abutment surfaces are substantially avoided. Thereby an improved linearity of the measuring signal and smaller tolerances of the sensitivity of the center sensor are obtained. Further, the pressure sleeve is mounted relatively inexpensively, so that the mounting surface no longer must be machined with high accuracy. Due to the high pressing force on the outer edge of the flange of the pressing sleeve, a good sealing action is produced which prevents penetration of moisture in the gap between the abutment surface on the pressure sleeve and the connected structural element which otherwise can cause corrosion of these surfaces.

In accordance with another feature of the present invention, the raised portion can be formed as a web or it can be formed conical and reduce toward the opening of the pressure sleeve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
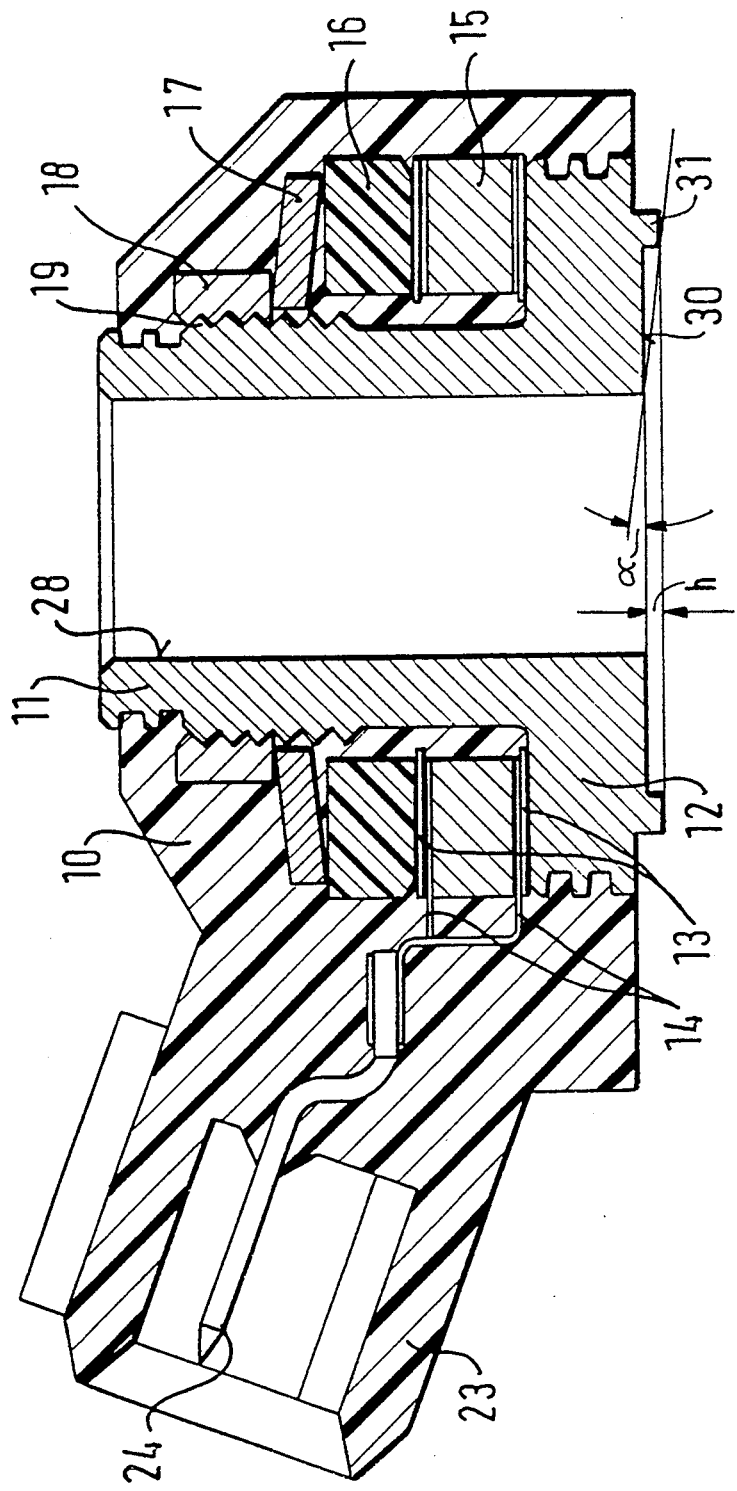
FIG. 1 is a view showing a longitudinal section of a knock sensor with a pressure sleeve in accordance with one embodiment of the present invention.

A knock sensor in accordance with the present invention has a housing which is identified with reference numeral 10. A pressure sleeve 11 is arranged in the housing 10. The pressure sleeve is provided with a flange-like edge 12 located near its lower end. The outer periphery of the pressure sleeve 11 is associated with several parts which will listed hereinabove starting from the edge 12. These parts include an insulating disc 13, a contact disc 14, a piezoceramic ceramic disc 15, and a reverse order a second contact disc 14 and a second insulating disc 13. A seismic mass 16 is arranged on the insulating disc 13. A cup spring 17 acts on the above mentioned parts, and its prestress is provided by a threaded ring 18 which is screwed on an outer thread 19 of the upper part of the pressure sleeve 11.

The housing 10 composed of synthetic plastic material and produced in particular by injection molding has an integrated attaching plug. Flat plugs 24 are molded in the attaching plug. They are connected with both contact discs 14. The pressure sleeve 11 is provided with a central opening 28 for a not shown mounting screw which mounts the knock sensor directly or indirectly on an internal combustion engine.

In accordances with the present invention, the pressure sleeve 11 on the abutment surface 30 of the edge 12 is provided with a circumferential web 31. The height h of the web is substantially smaller than the diameter of the edge 12 of the pressure sleeve 11. Also, the web 31 is spaced as far as possible from the opening 28. Further, normally a small outer edge region remains, which is used for performing the injection molding process for the housing 10. The height h of the web and its radial distance from the opening 28 of the pressure sleeve 11 are determined relative to one another so that a connecting line between the mouth of the opening 28 of the pressure sleeve 11 and the inner circumference of the web forms an angle of approximately 0.5°–1.5° to the abutment surface.

Figure 2:
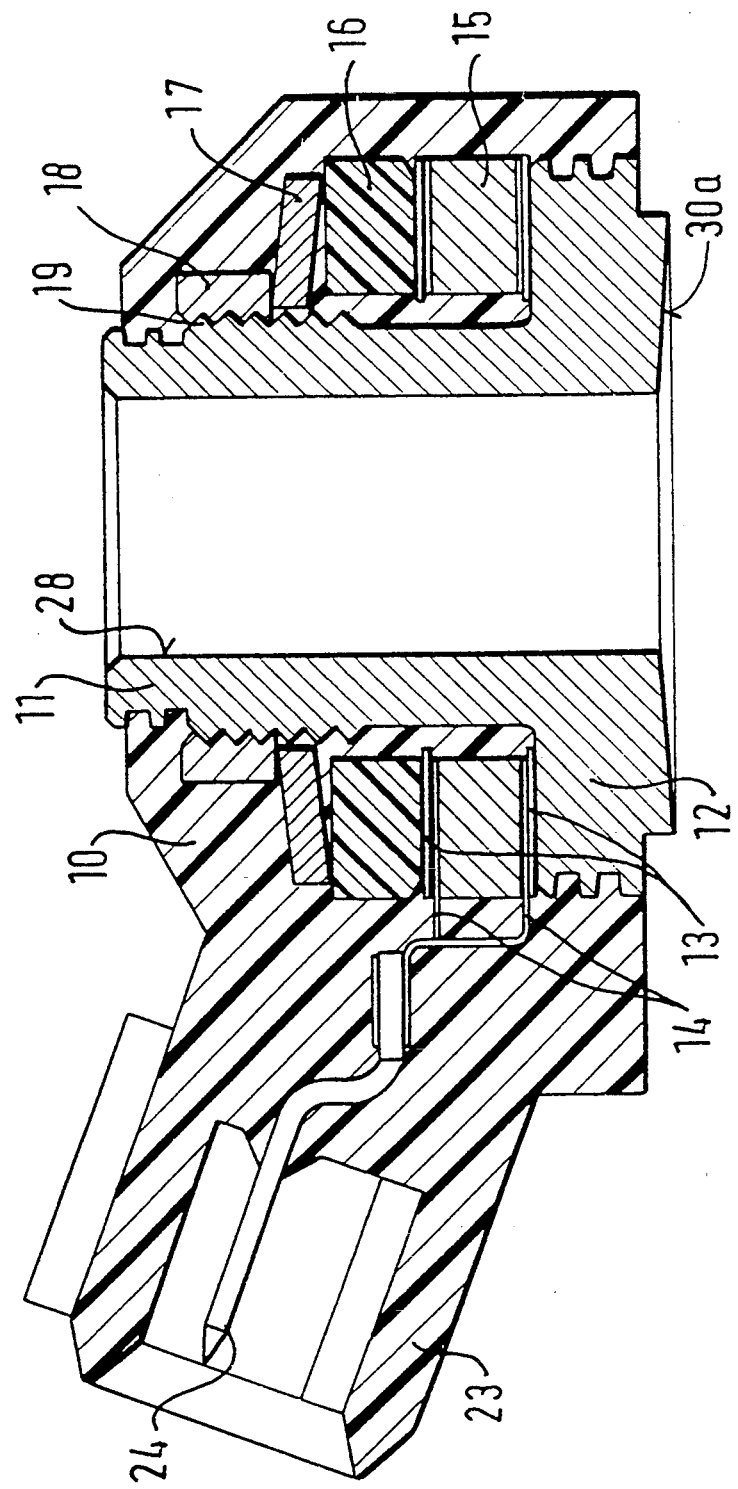
FIG. 2 is a view showing a longitudinal section of a knock sensor with a pressure sleeve in accordance with another embodiment of the invention.

In the embodiment of FIG. 2 an abutment surface 30a is conical. The abutment surface 30a raised toward the opening 28 and thereby forms also a raised portion in the outer region of the edge 12. Here also, the outer edge region can be retained for performing the injection molding process. A similar action to the action performed by the web 31 can also be performed by several raised portions arranged on the abutment surface in a star-like manner. Such smaller raised portions are also spaced as far as possible from the opening 28.

The total torque applied by the mounting screw is transmitted to the pressure sleeve 11, on in other words only small force acts from the mounting screw on the piezoceramic disc 15. The pretention force of the cup spring 17 is adjusted by the threaded wing 18 so that the axial forces applied to the piezoceramic disc are active directly without remaining worsening of its electrical signal, and it is substantially independent from thermal expansion as well as unavoidable compression of the pressure sleeve during mounting. The pulses applied by the seismic mass 16 proportionally to the vibrations of the internal combustion engine are converted in the piezoceramic disc 15 into electrical charges which can be read in corresponding measuring device. Due to the web 31 or the conical extension of the abutment surface 30a, the pressure sleeve 11 can be pressed completely against the mounting surface of the internal combustion engine. Thereby disturbing resonances can be reduced and the produced measuring signals have a high linearity and sensitivity. The base value of the measuring signal is substantially independent from the surface property, in particular roughness of the upper surface of the structural element. The base value can be located within a small tolerance band in the event of relatively great dispersion of the surface properties.

For optimum mounting, the angle $\alpha$ of the conical region of the embodiment 2 is very flat. In other words the angle between the conical region and the abutment surface is very small, for example from 0.5° to 1.5°. Steel or brass can be used as a material of the pressure sleeve. Furthermore, in order to select the angle it is necessary to take into consideration that during tightening of the not shown mounting screw the conical region comes to abutment from the outer edge, or in other words first the abutment region with a greater diameter comes to abutment against the structural element, and then with increasing tightening moment of the mounting screw the remaining region of the conical region comes to abutment against the structural element. Thereby substantially the entire conical region is brought to abutment. The deformation which is determined by the angle $\alpha$ must be located completely or predominantly in an elastic region of the utilized material, so that under the action of so-called residual elasticity during loosening of the mounting screw, the conical shape is again substantially restored.

During mounting by the mounting screw, in the embodiment of FIG. 1 first the surrounding area of the mouth of the opening is brought to abutment against the abutment surface of the structural element. Then gradually up to a residual region around the web the surface of the pressure sleeve facing the structural element abuts against the mounting surface. The same considerations are applicable for the embodiment of FIG. 1 as for the above mentioned embodiment of FIG. 2.

The thusly formed pressure sleeve can be also utilized for other sensors, such as for example an acceleration pickup or a vibration pickup.

It will be understood that each of the elements described above, or two, or more together, may also find a useful application in other types of constructions differing from the types described above.

While the invention has been illustrated and described as embodied in a pressure sleeve and a sensor provided therewith, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims:

1. A pressure sleeve in particular for a vibration pickup, comprising a body having an abutment surface for abutting against a structure and an opening for passing mounting element for mounting said body on the structure, said abutment surface being provided with at least one circumferential raised portion which is radially spaced from a central point of said abutment surface and formed so that between a mouth of said opening and an inner periphery of said raised portion an angle of substantially 0.5° to 1.5° is formed so as to improve a mechanical coupling of said body on the structure.

2. A pressure sleeve as defined in claim 1, wherein said raised portion is formed as a web.

3. A pressure sleeve as defined in claim 1, wherein said raised portion is conical and inclined toward said opening of said body.

4. A pressure sleeve in particular for a vibration pick, comprising a body having an abutment surface for abutting against a structure and an opening for guiding a mounting element for mounting body on the structure, said abutment surface being conical and inclined toward said opening of said body so that during mounting of said body on the structure a deformation of said abutment surface occurs which leads from an outer diameter of said abutment surface to a substantially complete abutment of said abutment surface on the structure.

5. A pressure sleeve as defined in claim 4, wherein said conical abutment surface has an angle of substantially between 0.5° and 1.5°.

6. A pressure sleeve as defined in claim 5, wherein said angle of said conical abutment surface is equal to substantially 1°±0.2°.

7. A pressure sleeve as defined in claim 1, wherein said body has a flange with a lower side, said abutment surface being formed as said lower side of said flange.

* * * * *